US012811787B2

(12) United States Patent
Dottax et al.

(10) Patent No.: US 12,811,787 B2
(45) Date of Patent: Nov. 24, 2026

(54) METHOD FOR PERFORMING A SECURE FUNCTION, AND ASSOCIATED SYSTEM

(71) Applicant: IDEMIA FRANCE, Courbevoie (FR)

(72) Inventors: Emmanuelle Dottax, Courbevoie (FR); Christophe Giraud, Courbevoie (FR); Guillaume Barbu, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 62 days.

(21) Appl. No.: 18/974,865

(22) Filed: Dec. 10, 2024

(65) Prior Publication Data

US 2025/0202698 A1 Jun. 19, 2025

(30) Foreign Application Priority Data

Dec. 13, 2023 (FR) ....................................... 2314084

(51) Int. Cl.
*H04L 9/08* (2006.01)
*H04L 9/30* (2006.01)

(52) U.S. Cl.
CPC ............ *H04L 9/302* (2013.01); *H04L 9/0825* (2013.01)

(58) Field of Classification Search
None
See application file for complete search history.

(56) References Cited

U.S. PATENT DOCUMENTS 10,289,816 B1 * 5/2019 Malassenet ......... G06F 9/45516
10,303,857 B2 5/2019 Van Foreest et al.
2016/0182472 A1 * 6/2016 Michiels ............. H04L 63/0876 713/171
2017/0237551 A1 * 8/2017 Van Foreest ............ G06F 21/10 713/189
2022/0417001 A1 12/2022 Shamsaasef et al.

FOREIGN PATENT DOCUMENTS

EP 3 210 332 B1 1/2020

OTHER PUBLICATIONS

Ben Fisch et al., "IRON: Functional Encryption sing Intel SGX", Apr. 29, 2017, IACR, International Association for Cryptologic Research, vol. 20170428:221846, pp. 1-37. (Year: 2017).*
Preliminary French Search Report issued Aug. 5, 2024 in French application 2314084 filed on Dec. 13, 2023, 9 pages (with Written Opinion).
Fisch et al., "IRON: Functional Encryption using Intel SGX", IACR, International Association for Cryptologic Research, 2017, 37 pages.

* cited by examiner

*Primary Examiner* — Nelson S. Giddins
(74) *Attorney, Agent, or Firm* — Oblon, McClelland, Maier & Neustadt, L.L.P.

(57) ABSTRACT

A method is provided for performing a secure function that maps an input message to an output message, the method being implemented by a system comprising a secure element and a white box implementation. The method includes:
- the white box implementation computing a processing datum based on the input message,
- the white box implementation encrypting the processing datum,
- sending the encrypted processing datum to the secure element,
- the secure element obtaining a result datum based on the encrypted processing datum, the result datum being the image of the processing datum by an intermediate function, and
- computing the output message based on the result datum.

13 Claims, 2 Drawing Sheets

METHOD FOR PERFORMING A SECURE FUNCTION, AND ASSOCIATED SYSTEM

The present invention relates to a method for performing a secure function that maps an input message to an output message, and to an associated system.

A secure function, for example a cryptographic function, conventionally uses data that are intended to remain secret, for example an underlying cryptographic key.

When a secure function is implemented by way of software executed in a non-secure environment, specific measures have to be taken to avoid an attacker being able to gain access to the secret data. The search for techniques for securing the implementation of a function in a non-secure environment is known as "white box cryptography".

Software implementations that make it possible to secure the implementation of a function in a non-secure environment are known as white box implementations.

The article "White Box Cryptography and an AES implementation", by S. Chow et al. in Post-Proceedings of the 9th Annual Workshop on Selected Areas in Cryptography (SAC'02), 15-16 Aug. 2002 proposes for example a technique for producing AES algorithms each adapted to a specific cryptographic key.

For the solutions that are generally proposed in this context, the secure function is decomposed into a series of elementary processing operations and lookup tables respectively associated with these elementary processing operations are used to manipulate masked data.

However, a white box implementation might not guarantee a sufficient level of security.

Some secure functions are intended to be executed in authorized environments. For example, a secure function allowing access to a vehicle is supposed to be executed only in the environment of an authorized user.

To guess the secret data of the secure function, an attack known as a "code lifting" attack consists in copying the white box implementation of the secure function to a non-secure environment under the complete control of an attacker.

In such an environment, the attacker is able to execute a very large number of iterations of the secure function and/or use tools, typically a debugging tool, to execute the secure function in stages. In addition, with such an attack, the attacker is able to substitute themselves for the authorized user and substitute an environment under their control for the authorized environment, for example in order to access a vehicle of said user.

To counter this type of attack, a first solution described in patent application US2019312718 consists of a white box implementation that uses, in decrypted form, an encoded encryption key received from a trusted execution environment.

However, this solution has the drawback of not being secure enough or of requiring a connection to a server to receive a key.

A second known solution consists of a white box implementation that sends a datum to a secure element. The secure element computes a result of applying a function to said datum and the white box implementation then verifies that the result computed by the secure element corresponds to the application of the function to said datum (for example by computing another result of applying the function to said datum or of applying the inverse of said function to the result).

This second solution has the drawback of also not being secure enough and of being expensive in terms of resources, typically in terms of computing time and memory size, for the non-secure environment implementing the solution.

A third solution consists in using a secure element to update the white box implementation and thus modify the behaviour of said white box implementation.

Unfortunately, implementing this solution requires replacing a lookup table of the white box implementation, this being expensive in terms of resources for the system implementing this solution, in particular for the secure element.

To rectify these drawbacks, the present invention proposes, according to a first aspect, a method for performing a secure function that maps an input message to an output message, the method being implemented by a system comprising a secure element and a white box implementation in a non-secure execution environment, the method being characterized in that it comprises the following steps:

- the white box implementation computing a processing datum based on the input message,
- the white box implementation encrypting the processing datum using an encryption key,
- sending the encrypted processing datum to the secure element,
- the secure element obtaining a result datum based on the encrypted processing datum and a decryption key associated with the encryption key, the result datum being the image of the processing datum by an intermediate function different from the identity function,
- computing the output message based on the result datum.

Further advantageous and non-limiting features of the method according to the invention, taken individually or in any technically possible combination, are as follows:

- the output message comprises the result datum;
- the method furthermore comprises a step of the white box implementation computing at least one other processing datum, and the output message furthermore comprises the other processing datum;
- the white box implementation has a first part and a second part, the computing of a processing datum based on the input message and the encrypting of the processing datum using an encryption key are implemented by the first part of the white box implementation, the computing of the output message based on the result datum is implemented by the second part of the white box implementation, and the method furthermore comprises a step of sending the result datum to the second part of the white box implementation;
- the method furthermore comprises the first part of the white box implementation computing at least one other processing datum, and the second part of the white box implementation using the at least one other processing datum to compute the output message based on the result datum;
- the secure element obtains the result datum through functional decryption of the encrypted processing datum using a functional decryption key for the intermediate function, the decryption key being said functional decryption key for the intermediate function;
- the encryption key is a public key of an RSA algorithm and the functional decryption key is obtained based on a private key of said RSA algorithm, the private key being associated with the public key, the RSA algorithm having a determined encryption modulus and the intermediate function being a modular exponentiation that raises the processing datum to a determined exponent modulo the determined encryption modulus;

the encryption key comprises an encryption exponent and the functional decryption key comprises a modular inverse of the encryption exponent and the determined exponent, or the result of the product of the encryption exponent and the determined exponent;

the encryption key is involved only in the step of the white box implementation encrypting the processing datum, and the decryption key is involved only in the step of the secure element obtaining a result datum;

the secure function is made up of a sequence of operations and the intermediate function is part of said sequence of operations;

the secure function is a cryptographic function that maps the input message to the output message using a predetermined cryptographic key;

the predetermined cryptographic key is a key distinct from the encryption key and from the decryption key.

At least some of the methods according to the invention may be computer-implemented. As a result, the present invention may take the form of an embodiment combining software aspects (comprising firmware, resident software, microcode, etc.) and hardware aspects, which may all together be called a "component" here.

According to a second aspect, the invention proposes a system for performing a secure function that maps an input message to an output message, the system being characterized in that it comprises:

a first component comprising all or part of a white box implementation in a non-secure execution environment, said all or part of the white box implementation being configured to compute a processing datum based on the input message and encrypt the processing datum using an encryption key, a secure element configured to receive the encrypted processing datum and obtain a result datum based on the encrypted processing datum and a decryption key associated with the encryption key, the result datum being the image of the processing datum by an intermediate function different from the identity function, a second component configured to receive the result datum and compute the output message based on the result datum.

Further advantageous and non-limiting features of the system according to the invention, taken individually or in any technically possible combination, are as follows:

the output message comprises the result datum;

the white box implementation has a first part and a second part, said all or part of the white box implementation of the first component is the first part of the white box implementation, the second component comprises the second part of the white box implementation in the non-secure execution environment, the second part of the white box implementation being configured to receive the result datum and compute the output message based on the result datum.

This system may be configured to implement each of the possible embodiments envisaged for the method as defined above.

Of course, the various features, variants and embodiments of the invention may be combined with one another in a variety of combinations provided that they are not incompatible or mutually exclusive.

Other features and advantages of the present invention will become apparent from the description given below, with reference to the appended figures, which illustrate exemplary embodiments of the invention that are completely non-limiting in nature.

In the figures:

FIG. 1 schematically shows one preferred embodiment of a system according to the invention, in particular for implementing a method according to the invention;

Unless otherwise indicated, elements common to a plurality of figures or analogous elements in a plurality of figures have been designated with the same reference signs and have identical or analogous features, and hence these common elements have generally not been described more than once for the sake of simplicity.

In the context of the present description, qualifiers "first", "second", "third" and "fourth" serve only as an indication to distinguish between elements that they qualify, but do not imply an order among them.

Figure 1:
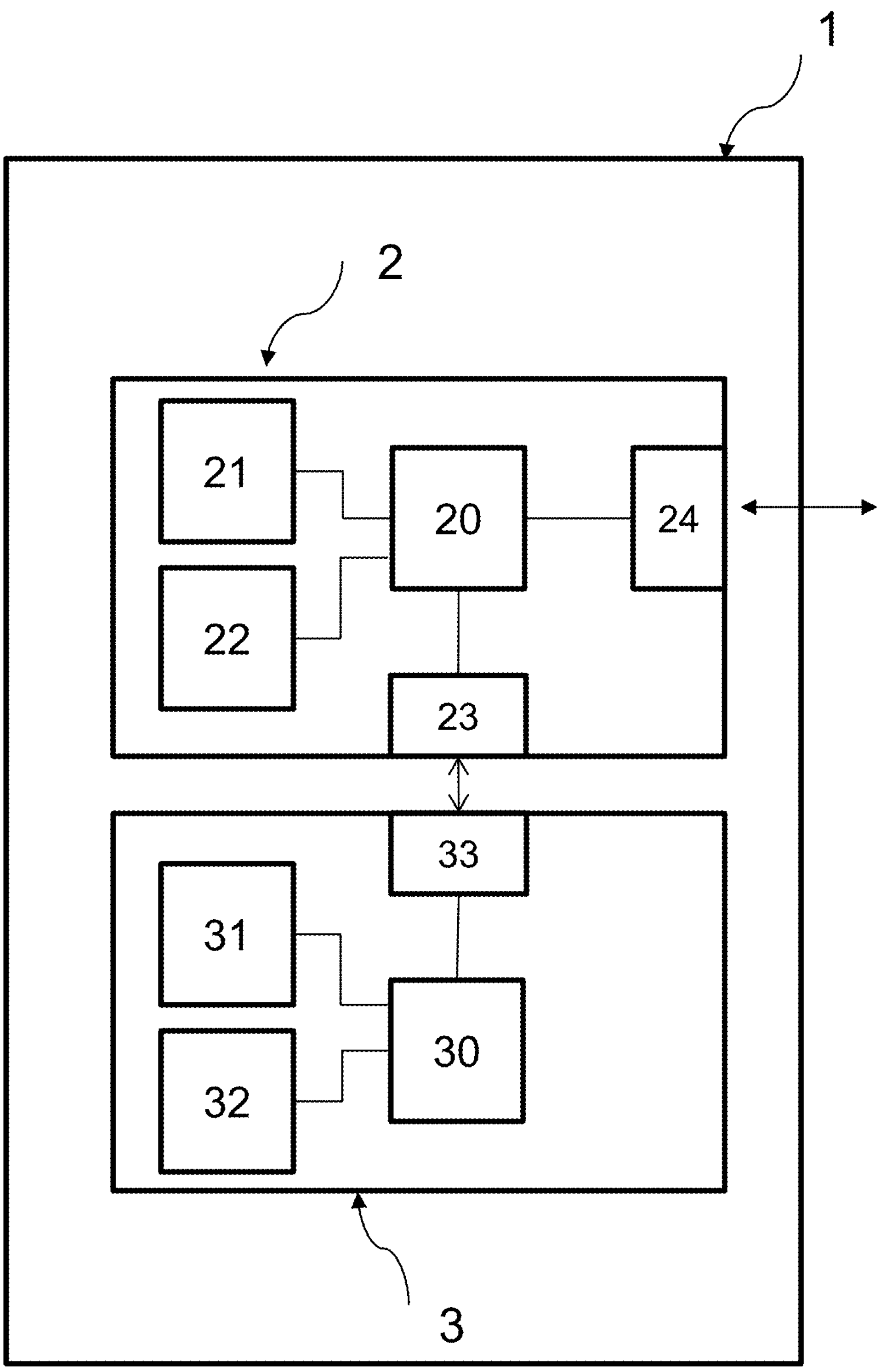

FIG. 1 schematically shows one preferred embodiment of a system 1 according to the invention.

The system 1 comprises a non-secure execution environment 2 and a secure element 3.

The system 1 is designed to perform a secure function that maps an input message to an output message.

The non-secure execution environment 2 comprises a processor-type data processing means 20, a data storage means 21, a random access memory 22, a first communication interface 23 and a second communication interface 24.

The data storage means 21 and the random access memory 22 of the non-secure execution environment 2 are each linked to the data processing means 20 of said non-secure execution environment 2 such that the data processing means 20 is able to read data from or write data to the data storage means 21 and/or the random access memory 22.

The data storage means 21 stores computer program instructions some of which are designed to implement steps of a method for performing a secure function as described with reference to FIG. 2 when these instructions are executed by the data processing means 20.

The data storage means 21 is for example, in practice, a hard drive or a non-volatile memory that is possibly rewritable, for example of EEPROM (for "Electrically Erasable and Programmable Read-Only Memory") type.

In addition, the data storage means 21 and the random access memory 22 may store at least some of the elements (in particular the encrypted processing datum and the result datum as described below with reference to FIG. 2) that are manipulated during the various processing operations performed in the course of the method described below.

In the remainder of the description, either one of the data storage means 21 and the random access memory 22 will be referred to as a memory.

The non-secure execution environment 2 also comprises multiple components that are not shown. Typically, the non-secure execution environment 2 comprises a first component and a second component.

These components may, in practice, be formed by a combination of hardware elements and software elements.

Each component is configured to carry out a step of a method according to the invention, and therefore has a functionality described in the method according to the invention and explained below.

The first component comprises all or part of a white box implementation.

The system 1 therefore comprises a white box implementation in the non-secure execution environment 2. The system 1, typically the non-secure execution environment 2, stores the white box implementation.

According to a first exemplary embodiment of the components, the white box implementation has a first part and a second part, said all or part of the white box implementation of the first component is the first part of the white box implementation, and the second component comprises the second part of the white box implementation.

According to a second exemplary embodiment of the components, the first component comprises all or part of the white box implementation, and the second component does not comprise all or part of the white box implementation.

For each component, the non-secure execution environment 2 stores for example software instructions (also called computer program instructions) able to be executed by the processing means 20 in order to use a hardware element (for example a memory) and thus to implement the functionality offered by the component.

According to one possible embodiment, the computer program instructions stored in the data storage means 21 were received (for example from a remote computer via the second communication interface 24) during an operating phase of the non-secure execution environment 2, prior to the method described with reference to FIG. 2.

The data processing means 20 is therefore configured to implement certain steps of the method for performing a secure function that will be described below.

The data processing means 20 may have any structure. The data processing means 20 comprises one or more cores, each core being configured to execute code instructions of a program so as to implement the abovementioned steps.

The first communication interface 23 is connected to the data processing means 20 so as to allow the non-secure execution environment 2 to communicate with the secure element 3 via another communication interface 33 of the secure element 3.

The first communication interface is of any type. It is for example a wired interface using any communication protocol, for example of OPC ("Open Platform Communications") type, or in accordance with the ISO/IEC 7816 standard in one of its already published versions.

The first communication interface 23 allows the non-secure execution environment 2 to send data to the secure element 3, for example an encrypted processing datum as described with reference to FIG. 2, and/or to receive data from the secure element 3, for example a result datum as described with reference to FIG. 2.

The second communication interface 24 is connected to the data processing means 20 so as to allow the data processing means 20 to receive an input message from an electronic device, not shown, and/or to send an output message to said electronic device, not shown.

The second communication interface 24 is of any type. It is for example a wired (Ethernet) interface or a wireless radio interface using any communication protocol (Wi-Fi, Bluetooth, NFC, etc.). The secure element 3 comprises another processor-type data processing means 30, another data storage means 31, another random access memory 32 and the other communication interface 33. The other data storage means 31 and the other random access memory 32 of the secure element 3 are each linked to the other data processing means 30 of said secure element 3 such that the other data processing means 30 is able to read data from or write data to the other data storage means 31 and/or the other random access memory 32.

The other data storage means 31 stores computer program instructions some of which are designed to implement steps of a method for performing a secure function as described with reference to FIG. 2 when these instructions are executed by the other data processing means 30.

The other data storage means 31 is for example, in practice, a non-volatile memory that is possibly rewritable, for example of EEPROM (for "Electrically Erasable and Programmable Read-Only Memory") type.

In addition, the other data storage means 31 and the other random access memory 32 may store at least some of the elements (in particular the encrypted processing datum and the result datum as described below with reference to FIG. 2) that are manipulated during the various processing operations performed in the course of the method described below.

In the remainder of the description, either one of the other data storage means 31 and the other random access memory 32 will be referred to as another memory.

The secure element 3 stores for example software instructions able to be executed by the other processing means 30 in order to use a hardware element (for example another memory) and thus to implement one or more steps of the methods according to the invention, and therefore one or more functionalities described in the method according to the invention and explained below.

According to one possible embodiment, the computer program instructions stored in the other data storage means 31 were received (for example from another remote computer, or from the non-secure execution environment 2, via the other communication interface 33) during an operating phase of the secure element 3 prior to the method described with reference to FIG. 2.

The other data processing means 30 is therefore configured to implement certain steps of the method for performing a secure function that will be described below.

The other data processing means 30 may have any structure. The other data processing means 30 comprises one or more cores, each core being configured to execute code instructions of a program so as to implement the abovementioned steps.

The other communication interface 33 is connected to the other data processing means 30 so as to allow the secure element 3 to communicate with the non-secure execution environment 2 via the first communication interface 23 of the non-secure execution environment 2.

The other communication interface 33 is of the same type as the first communication interface 23. It is for example a wired interface using a communication protocol, for example of OPC ("Open Platform Communications") type, or in accordance with the ISO/IEC 7816 standard in one of its already published versions.

The other communication interface 33 allows the secure element 3 to send data to the non-secure execution environment 2, for example a result datum as described with reference to FIG. 2, and/or to receive data from the non-secure execution environment 2, for example an encrypted processing datum as described with reference to FIG. 2.

According to a first example, the non-secure environment 2 is a communication terminal, a personal computer, a tablet or a server, and the secure element 3 is a chip integrated into a chip card, such as an identity card, a bank card or a universal integrated circuit card (also known as a UICC), such as a subscriber card to a cellular network, typically a SIM card.

According to a second example, the system 1 is a communication terminal, a personal computer, a tablet or a server, and the secure element 3 is a secure microcontroller or a trusted execution environment (also referred to using the acronym TEE) that is integrated into said communication terminal, personal computer, tablet or server.

Figure 2:
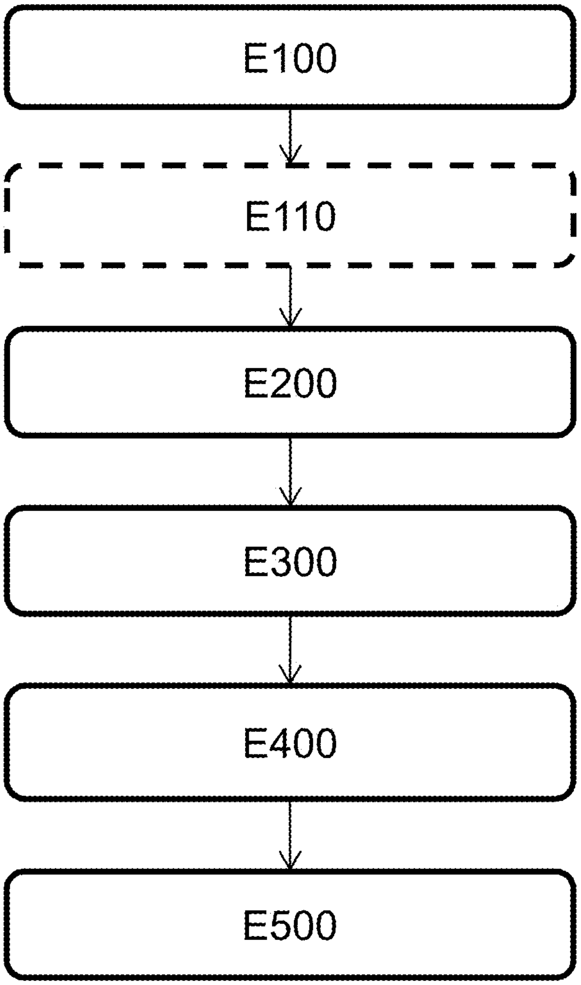
FIG. 2 illustrates, in the form of a flowchart, the main steps of a method for performing a secure function according to the invention.

FIG. 2 illustrates, in the form of a flowchart, the main steps of a method for performing a secure function according to the invention.

This method is implemented by the system 1.

The secure function maps an input message to an output message.

The secure function may be a cryptographic function that maps the input message to the output message using a predetermined cryptographic key.

The cryptographic function comprises for example an encryption function, a decryption function, a signature function or a signature verification function using the predetermined cryptographic key.

The predetermined cryptographic key is then preferably a key distinct from the encryption key and from the decryption key described below.

In a step of computing a processing datum (step E100), a processing datum is computed based on the input message by the white box implementation.

According to one possibility, the processing datum may be the input message or a first part of the input message.

According to another possibility, the processing datum may be the result of applying a first other function to the input message or to a first part of the input message.

The method may then comprise a step of computing at least one other processing datum (step E110) during which at least one other processing datum is computed by the white box implementation.

According to a first possibility, the other processing datum may be the input message or a second part of the input message.

According to a second possibility, the other processing datum may be the result of applying a second other function to the input message, to a second part of the input message, to the processing datum or to a first part of the processing datum.

This step of computing at least one other processing datum is optional and may be omitted.

The method then comprises an encryption step (step E200) during which the white box implementation encrypts the processing datum using an encryption key.

Typically, the encryption is in accordance with an asymmetric cryptographic algorithm, for example RSA or based on elliptic curves, or a symmetric cryptographic algorithm, for example DES, 3DES or AES.

When the encryption is in accordance with an asymmetric cryptographic algorithm, the encryption key is a public key in the sense of said asymmetric cryptographic algorithm.

The method then comprises a step (step E300) of sending the encrypted processing datum to the secure element 3 of the system 1, the encrypted processing datum being the result of the encryption implemented by the white box implementation during the encryption step (step E200).

Typically, the non-secure execution environment 2 of the system 1 sends the encrypted processing datum to the secure element 3 via the first communication interface 23, and the secure element 3 receives the encrypted processing datum via the other communication interface 33.

The method then comprises an obtaining step (step E400) during which the secure element 3 obtains a result datum based on the encrypted processing datum and a decryption key associated with the encryption key, the result datum being the image of the processing datum, that is to say of the unencrypted processing datum, by an intermediate function different from the identity function. Typically, when the encryption in the encryption step (step E200) is in accordance with a symmetric cryptographic algorithm, for example DES, 3DES or AES, the secure element 3 obtains the result datum based on the encrypted processing datum and a decryption key associated with the encryption key, by decrypting the encrypted processing datum in accordance with said symmetric cryptographic algorithm with said decryption key and then by applying the intermediate function to the result of the decryption.

When the encryption in the encryption step (step E200) is in accordance with an asymmetric cryptographic algorithm, for example RSA or based on elliptic curves, the secure element 3 may obtain the result datum based on the encrypted processing datum and a decryption key associated with the encryption key, by decrypting the encrypted processing datum in accordance with said asymmetric cryptographic algorithm with said decryption key and then by applying the intermediate function to the result of the decryption. The decryption key is then a private key in the sense of said asymmetric cryptographic algorithm.

Preferably, the asymmetric cryptographic algorithm is a functional encryption algorithm.

In this case, the secure element 3 obtains the result datum through functional decryption of the encrypted processing datum using a functional decryption key for the intermediate function, the decryption key being said functional decryption key for the intermediate function.

The method is thus more secure. The intermediate function is concealed in the functional decryption key, thereby increasing its confidentiality.

The method furthermore makes it possible to limit computing times and the memory space consumed for the secure element, the implementation of the decryption applying the intermediate function to the processing datum.

Some examples of functional encryption algorithms are described in the document "Simple Functional Encryption Schemes for Inner Products", Michel Abdalla, Florian Bourse, Angelo De Caro, and David Pointcheval, DOI: 10.1007/978-3-662-46447-2_33.

The algorithm in section 3 of that document, called "Inner-Product from DDH", thus makes it possible to obtain an intermediate datum having the value of a generator g raised to a power equal to the product of the processing datum (x in the cited document) and another predetermined datum (y in the cited document), the generator g belonging to a group of order p, with p being a prime number. The result datum may be the intermediate datum, the intermediate function then being that of raising the generator g to a power equal to the product of the processing datum (x in the cited document) and another predetermined datum (y in the cited document). According to another possibility, the result datum may be obtained by the secure element 3 based on the intermediate datum, for example through a discrete logarithm of the intermediate datum, the result datum then having the value of the result of the product of the processing datum and the other predetermined datum, and the intermediate function being the product of the processing datum and the other predetermined datum. It should be noted that the decryption key and the encryption key are sky and mpk, respectively, in section 3 of the cited document.

Preferably, the functional encryption algorithm is an RSA algorithm having a determined encryption modulus N and the intermediate function is a modular exponentiation that raises the processing datum to a determined exponent modulo the determined encryption modulus.

Thus, the encryption key is a public key of an RSA algorithm and the functional decryption key is obtained based on a private key of said RSA algorithm, the private key being associated with the public key, the RSA algorithm having a determined encryption modulus and the intermediate function being a modular exponentiation that raises the processing datum to a determined exponent modulo the determined encryption modulus.

The method thus allows a simple and resource-inexpensive implementation of the intermediate function using functional decryption.

Typically, the encryption key comprises an encryption exponent e and the functional decryption key comprises a modular inverse d of the encryption exponent e and the determined exponent a, or the result of the product of the encryption exponent and the determined exponent, that is to say a×d. Thus, during the encryption step (step E200), the white box implementation may encrypt the processing datum as follows: $u=x^e \bmod N$, with x being the processing datum and u being the encrypted processing datum.

During the obtaining step (step E400), the secure element 3 may obtain the result datum as follows: $z=u^{a \times d} \bmod N$, with z being the result datum.

The result datum z therefore has the value $x^a \bmod N$. In other words, the intermediate function is a modular exponentiation that raises the processing datum x to the determined exponent a modulo the determined encryption modulus N.

The determined exponent a is an integer, for example 2.

Preferably, the intermediate function does not implement all or part of the cryptographic key.

This thus provides more freedom in terms of choosing the secure function and the cryptographic key, deploying the cryptographic key and managing the associated access operations.

The method then comprises a step of computing the output message (step E500), during which the system 1 computes the output message based on the result datum.

According to one particular embodiment of the method, typically when the first component and the second component of the system 1 are implemented according to the first exemplary embodiment of the components described with reference to FIG. 1, the white box implementation has a first part and a second part, the computing (step E100) of a processing datum based on the input message and the encryption (step E200) of the processing datum using an encryption key are implemented by the first part of the white box implementation, and the computing (step E500) of the output message based on the result datum is implemented by the second part of the white box implementation.

The method then comprises, typically between the obtaining step (step E400) and the step of computing the output message (step E500), a step (not shown) of sending the result datum to the second part of the white box implementation.

Typically, the secure element 3 of the system 1 sends the result datum to the second part of the white box implementation, by sending the result datum to the non-secure execution environment 2 of the system 1 via the other communication interface 33, the non-secure execution environment and the second part of the white box implementation receiving the result datum via the first communication interface 23.

According to another particular embodiment of the method, typically when the first component and the second component of the system 1 are implemented according to the second exemplary embodiment of the components described with reference to FIG. 1, the computing (step E500) of the output message based on the result datum is not implemented by all or part of the white box implementation.

The method may then comprise, typically between the obtaining step (step E400) and the step of computing the output message (step E500), a step (not shown) of sending the result datum to the non-secure environment 2.

Typically, the secure element 3 of the system 1 may send the result datum to the non-secure environment 2 of the system 1 via the other communication interface 33, the non-secure execution environment 2 receiving the result datum via the first communication interface 23.

Preferably, when the method is in accordance with the other particular embodiment, the output message comprises the result datum. The output message may be the result datum.

The method, in particular according to the particular embodiment or the other particular embodiment described above, makes it possible to limit computing times and the memory space consumed, in particular by the white box implementation.

The output message is computed based on the result datum.

The obtaining step (step E400) implemented by the secure element 3 contributes to the computations of the secure function by obtaining the result datum based on the processing datum. The system 1, in particular the second part of the white box implementation, does not need to verify that the result datum corresponds to the result of applying the intermediate function to the processing datum. If the result datum does not correspond to the result of applying the intermediate function to the processing datum, the output message that is obtained will be erroneous. Indeed, the output message will not be the image of the input message by the secure function.

The computing in the step of computing a processing datum (step E100), the intermediate function and the computing in the step of computing the output message (E500) are therefore chosen so as to implement the secure function.

The method is furthermore particularly secure.

An attacker observing data exchanges between the white box implementation (and/or the non-secure environment 2) and the secure element 3 does not access the processing datum and is not able to deduce the intermediate function therefrom, because the processing datum is encrypted. Within the system 1, the encryption key is preferably integrated only into the white box implementation, and is not stored as such in the memory of the system 1.

When the method is in accordance with the particular embodiment described above, the encryption key is preferably integrated only into the first part of the white box implementation, and is not stored as such in the memory of the system 1.

Within the system 1, the decryption key is preferably stored only in the secure element 3, and is not integrated into the white box implementation.

Also preferably, the encryption key is involved only in the step of the white box implementation encrypting the processing datum (step E200), and the decryption key is involved only in the step of the secure element obtaining a result datum (step E400).

The method is thus more secure.

As already mentioned, the system 1, in particular the second part of the white box implementation, does not need to verify that the result datum corresponds to the result of applying the intermediate function to the processing datum. If the result datum does not correspond to the result of applying the intermediate function to the processing datum, the output message that is obtained will be erroneous. Indeed, the output message will not be the image of the input message by the secure function.

Preferably, the computing of the output message based on the result datum during the step of computing the output message (step E500) differs from applying an inverse function of the intermediate function to the result datum.

Furthermore, when the method is in accordance with the particular embodiment described above, the computing (step E500) of the output message based on the result datum differs from the identity function.

The method is thus more secure.

When the method is in accordance with the particular embodiment and the method comprises the step of computing at least one other processing datum (step E110), said step of computing at least one other processing datum (step E110) is implemented by the first part of the white box implementation, and the second part of the white box implementation advantageously uses the at least one other processing datum to compute the output message based on the result datum (step E500).

Also advantageously, when the method is in accordance with the other particular embodiment described above and the method comprises the step of computing at least one other processing datum (step E110), the output message furthermore comprises the other processing datum.

The method is thus more secure.

The step of computing at least one other processing datum (step E110) contributes to the computations of the secure function by obtaining the other processing datum. The computing of the at least one other processing datum, where applicable the second other function, is chosen so as to implement the secure function.

It should be noted that, in the method for performing a secure function according to the invention, and/or in the system 1 according to the invention, the secure function may be made up of a sequence of operations, the intermediate function being part of said sequence of operations.

Typically, the secure function is made up of a sequence of operations implemented on input data.

An operation may be an arithmetic operation or a Boolean arithmetic operation, for example an addition, a subtraction, a multiplication, a division, an exponentiation or a logarithm.

An operation may also be a logical operation, for example disjunction, conjunction or negation.

An input datum may comprise all or part of the input message, and/or all or part of at least one intermediate datum.

An intermediate datum is the result of applying an operation from said sequence of operations to at least one input datum.

The computing (step E100) of the processing datum based on the input message, by the white box implementation, then consists in applying a first part of the sequence of operations that make up the secure function.

The processing datum is thus an intermediate datum.

The first part of the sequence of operations that make up the secure function comprises at least one operation from said sequence of operations that make up the secure function.

Typically, applying a first other function to the input message or to a first part of the input message consists of the first part of the sequence of operations that make up the secure function.

The obtaining step (step E400) implemented by the secure element then carries out a second part of the sequence of operations that make up the secure function, said second part of the sequence of operations that make up the secure function constituting the intermediate function applied to the processing datum.

The second part of the sequence of operations that make up the secure function comprises at least one operation from said sequence of operations that make up the secure function.

The second part of the sequence of operations that make up the secure function is typically disjoint from the first part of the sequence of operations described above.

The processing datum is an input datum for the intermediate function.

The result datum is the result of implementing said second part of the sequence of operations that make up the secure function. The result datum is therefore an intermediate datum.

When the method is in accordance with the particular embodiment described above, the result datum is then used for an input datum of at least one operation of a third part of the sequence of operations that make up the secure function.

Said at least one operation of a third part of the sequence of operations is implemented in the computing (step E500) of the output message based on the result datum, by the second part of the white box implementation.

The third part of the sequence of operations that make up the secure function is typically disjoint from the first part of said sequence of operations and from the second part of said sequence of operations described above.

When the method is in accordance with the other particular embodiment described above, the result datum may be used for an input datum of at least one operation of a third part of the sequence of operations that make up the secure function. Said at least one operation of a third part of the sequence of operations is implemented in the computing (step E500) of the output message based on the result datum, typically by the second module of the system 1.

It should be noted that the step of the white box implementation computing (E110) at least one other processing datum may consist in implementing a fourth part of the sequence of operations that make up the secure function.

Typically, applying a second other function to the input message, to a second part of the input message, to the processing datum or to a first part of the processing datum consists of said fourth part of the sequence of operations that make up the secure function.

The fourth part of the sequence of operations that make up the secure function comprises at least one operation from said sequence of operations that make up the secure function.

The fourth part of the sequence of operations that make up the secure function is typically disjoint from the first part of said sequence of operations, from the second part of said sequence of operations, and from the third parts described above.

Figure 3:
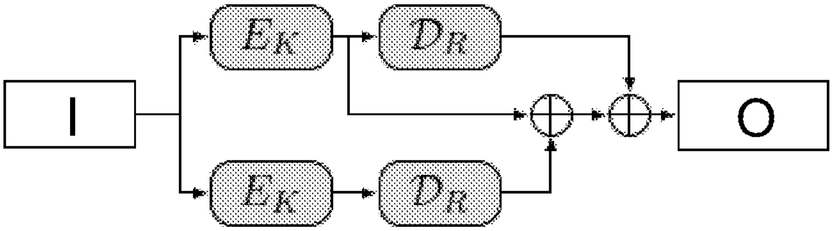
FIG. 3 illustrates one example of a secure function performed by a method or a system according to the invention.

FIG. 3 illustrates one example of a secure function performed by a method or a system according to the invention.

The secure function illustrated in this figure maps an input message I to an output message O, and makes it possible to execute a symmetric encryption algorithm $E_k$ with a predetermined cryptographic key K, said execution being secured against faults by using an infective countermeasure.

The secure function comprises obtaining a first provisional result through a first execution of the encryption $E_k$ applied to the input message I, and obtaining a second provisional result through a first execution of a diffusion function $D_R$ applied to the first provisional result.

The secure function also comprises obtaining a third provisional result through a second execution of the encryption $E_k$ applied to the input message I, and obtaining a fourth provisional result through a second execution of the diffusion function $D_R$ applied to the third provisional result. The secure function then obtains the output message O through an "exclusive-or" combination between the second provisional result, the fourth provisional result and another provisional result from among the first provisional result and the third provisional result.

The diffusion function $D_R$ is typically a hash function parameterized with a value R.

The secure function illustrated in FIG. 3 is described in the document "A high-Order infective Countermeasure Framework", Guillaume Barbu; Luk Bettale; Laurent Castelnovi; Thomas Chabrier; Nicolas Debande; Christophe Giraud; Nathan Reboud, DOI: 10.1109/FDTC53659.2021.00012.

One example of a method according to the invention, for performing this secure function, consists in the two executions of the encryption $E_k$ and one of the executions of the diffusion function $D_R$ being implemented by the white box implementation, typically during the step of computing a processing datum (step E100) and the step of computing at least one other processing datum (step E110).

The other processing datum comprises the first provisional result or the third provisional result. If the white box implementation implements the first execution of the diffusion function $D_R$, the processing datum comprises the third provisional result and the value R, the other processing datum furthermore comprises the second provisional result, the intermediate function is the diffusion function, and the result datum is the fourth provisional result.

If the white box implementation implements the second execution of the diffusion function $D_R$, the processing datum comprises the first provisional result and the value R, the other processing datum furthermore comprises the fourth provisional result, the intermediate function is the diffusion function, and the result datum is the second provisional result.

The computing (step E500) of the output message based on the result datum is then implemented by the second part of the white box implementation, and obtains the output message through the "exclusive-or" combination of the second provisional result, the fourth provisional result and another provisional result from among the first provisional result and the third provisional result, the other provisional result being the first provisional result, or the third provisional result, contained in the other processing datum.

According to one variant of this example, the other processing datum has the value of the "exclusive-or" combination of a provisional result from among the first provisional result or the third provisional result, with the second provisional result if the white box implementation implements the first execution of the diffusion function $D_R$, or with the fourth provisional result if the white box implementation implements the second execution of the diffusion function $D_R$, and the computing (step E500) of the output message based on the result datum obtains the output message through the "exclusive-or" combination between the result datum and the other processing datum.

A person skilled in the art will understand that the embodiments, variants and various features described above may be combined with one another in a variety of combinations provided that they are not incompatible or mutually exclusive.

The invention claimed is:

1. A method for performing a secure function that maps an input message to an output message, the method being implemented by a system comprising a secure element and a white box implementation in a non-secure execution environment, the method comprising:

computing, by the white box implementation, a processing datum based on the input message, encrypting, by the white box implementation, the processing datum using an encryption key, sending the encrypted processing datum to the secure element, obtaining, by the secure element, a result datum based on the encrypted processing datum and a decryption key associated with the encryption key, the result datum being the image of the processing datum by an intermediate function different from the identity function, computing the output message based on the result datum, wherein the secure element obtains the result datum through functional decryption of the encrypted processing datum using a functional decryption key for the intermediate function, the decryption key being said functional decryption key for the intermediate function.

2. The method for performing a secure function according to claim 1, wherein the output message comprises the result datum.

3. The method for performing a secure function according to claim 1, the method furthermore comprising a step of the white box implementation computing at least one other processing datum, and the output message furthermore comprising the other processing datum.

4. The method for performing a secure function according to claim 1, wherein:

the white box implementation has a first part and a second part;

the computing of a processing datum based on the input message and the encrypting of the processing datum using an encryption key are implemented by the first part of the white box implementation;

the computing of the output message based on the result datum is implemented by the second part of the white box implementation;

the method furthermore comprising a step of sending the result datum to the second part of the white box implementation.

5. The method for performing a secure function according to claim 1, the method furthermore comprising:

the first part of the white box implementation computing at least one other processing datum, and the second part of the white box implementation using the at least one other processing datum to compute the output message based on the result datum.

6. The method for performing a secure function according to claim 1, wherein the encryption key is a public key of an RSA algorithm and the functional decryption key is obtained based on a private key of said RSA algorithm, the private key being associated with the public key, the RSA algorithm having a determined encryption modulus and the intermediate function being a modular exponentiation that raises the processing datum to a determined exponent modulo the determined encryption modulus.

7. The method for performing a secure function according to claim 6, wherein the encryption key comprises an encryption exponent and the functional decryption key comprises a modular inverse of the encryption exponent and the determined exponent, or the result of the product of the encryption exponent and the determined exponent.

8. The method for performing a secure function according to claim 1, wherein:

the encryption key is involved only in the step of the white box implementation encrypting the processing datum, and the decryption key is involved only in the step of the secure element obtaining a result datum.

9. The method for performing a secure function according to claim 1, wherein the secure function is made up of a sequence of operations and the intermediate function is part of said sequence of operations.

10. The method for performing a secure function according to claim 1, wherein the secure function is a cryptographic function that maps the input message to the output message using a predetermined cryptographic key.

11. The method for performing a secure function according to claim 10, wherein the predetermined cryptographic key is a key distinct from the encryption key and from the decryption key.

12. A system for performing a secure function that maps an input message to an output message, the system comprising:

at least one processor configured to implement a white box implementation in a non-secure execution environment, the white box implementation being configured to compute a processing datum based on the input message and encrypt the processing datum using an encryption key; and a secure element configured to receive the encrypted processing datum and obtain a result datum based on the encrypted processing datum and a decryption key associated with the encryption key, the result datum being the image of the processing datum by an intermediate function different from the identity function, wherein the at least one processor is configured to receive the result datum and compute the output message based on the result datum, wherein the secure element is configured to obtain the result datum through functional decryption of the encrypted processing datum using a functional decryption key for the intermediate function, the decryption key being said functional decryption key for the intermediate function.

13. The system for performing a secure function according to claim 12, wherein the output message comprises the result datum.

* * * * *